(12) United States Patent
Orjela

(10) Patent No.: US 7,194,781 B1
(45) Date of Patent: Mar. 27, 2007

(54) WINDSCREEN WIPER DEVICE WITH LIFE SPAN INDICATOR

(75) Inventor: Gurdev Orjela, Aubange (BE)

(73) Assignee: Federal-Mogul S.A., Aubange (BE)

( * ) Notice: Subject to any disclaimer, the term of this patent is extended or adjusted under 35 U.S.C. 154(b) by 473 days.

(21) Appl. No.: 10/130,908

(22) PCT Filed: Nov. 21, 2000

(86) PCT No.: PCT/EP00/11783

§ 371 (c)(1),
(2), (4) Date: Aug. 21, 2002

(87) PCT Pub. No.: WO01/38148

PCT Pub. Date: May 31, 2001

(30) Foreign Application Priority Data

Nov. 24, 1999 (EP) .................................. 99203939

(51) Int. Cl.
*B60S 1/38* (2006.01)
*B60S 1/04* (2006.01)

(52) U.S. Cl. ............................. 15/250.001; 15/250.48; 15/250.361; 422/55; 422/58; 324/694; 116/200; 116/206; 116/208

(58) Field of Classification Search ............. 15/250.48, 15/250.001, 250.361, 250.44, 250.351; 324/694; 422/55, 58; 116/200, 208, 206
See application file for complete search history.

(56) References Cited

U.S. PATENT DOCUMENTS 2,971,209 A 2/1961 Coulter
4,156,951 A * 6/1979 Sharp .................... 15/250.454
4,212,153 A * 7/1980 Kydonieus et al. .......... 368/62
4,226,274 A 10/1980 Awaya et al.
5,052,072 A * 10/1991 Chen .................... 15/250.454
5,130,290 A * 7/1992 Tanimoto .................... 503/201
5,322,031 A * 6/1994 Lerner et al. ............... 116/208
5,349,718 A 9/1994 Gibbon
5,690,146 A 11/1997 Stammen
5,704,999 A 1/1998 Lukich et al.
5,823,891 A * 10/1998 Winskowicz ................ 473/378
6,047,436 A * 4/2000 Rohrbach et al. ...... 15/250.361
6,623,382 B2 * 9/2003 Winskowicz ............... 473/378
6,775,877 B1 * 8/2004 Broszniowski ......... 15/250.001
2003/0096107 A1 * 5/2003 Birkholz et al. ........... 428/343
2003/0235119 A1 * 12/2003 Wien et al. ................ 368/327
2004/0067590 A1 * 4/2004 Elhard et al. .................. 436/2
2004/0178807 A1 * 9/2004 Sahlberg et al. ........... 324/694

FOREIGN PATENT DOCUMENTS

| DE | 3639831 A1 | 5/1988 |
| EP | 1 103 435 A1 | 11/1999 |
| FR | 2753943 | 9/1996 |
| FR | 2 787 076 | 12/1998 |
| WO | WO 95/01896 | 6/1994 |
| WO | WO 00/35726 | 12/1999 |

* cited by examiner

*Primary Examiner*—Gary K. Graham
(74) *Attorney, Agent, or Firm*—Robert L. Stearns; Dickinson Wright PLLC

(57) ABSTRACT

A windscreen wiper device comprising an oscillating arm and a frame connected thereto for receiving a wiper blade, which device includes a life span indicator, characterized in that said indicator is sensitive to water. The indicator can change its color in dependence on the length of time during which the indicator has-been exposed to water.

15 Claims, 1 Drawing Sheet

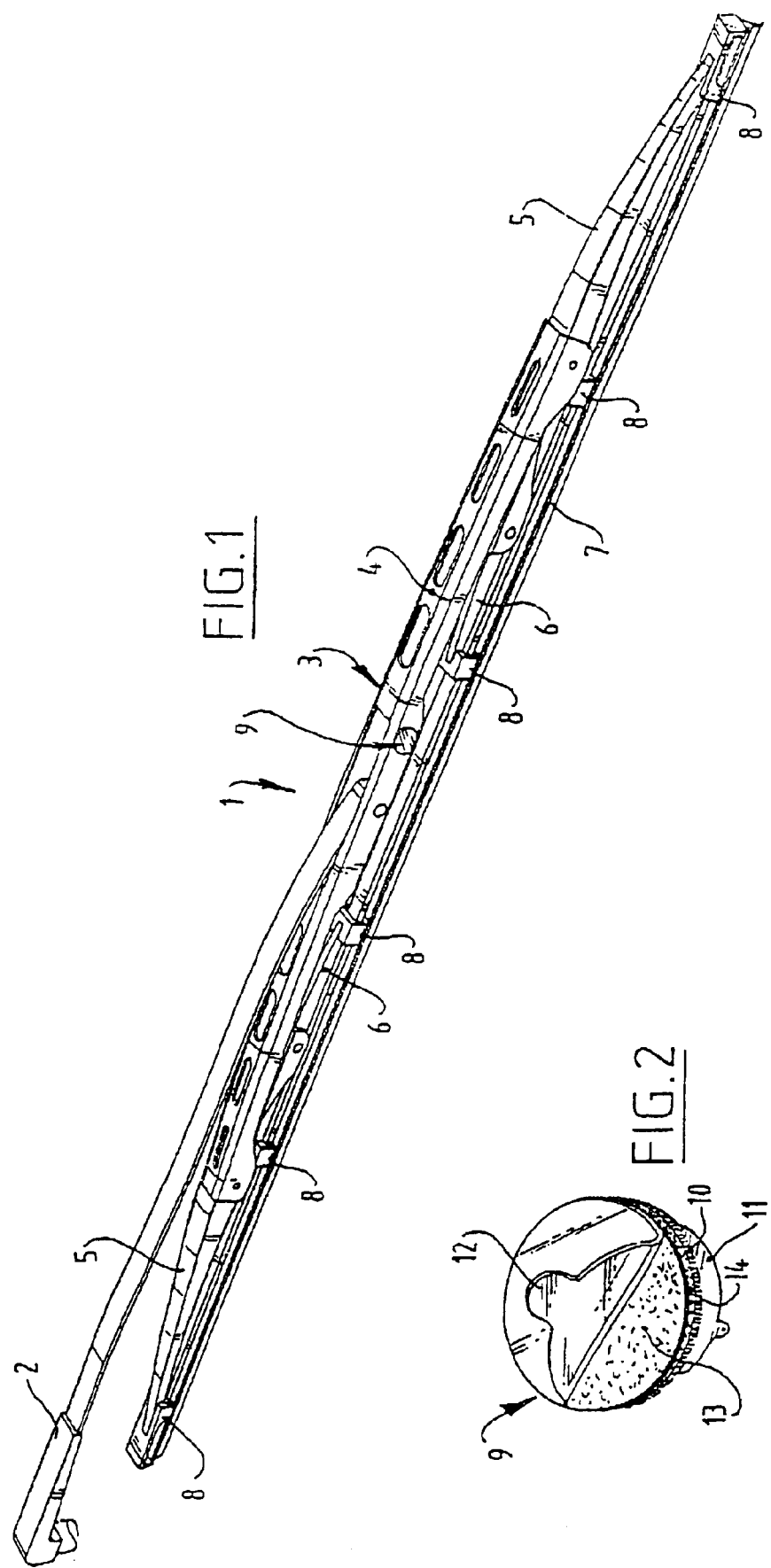

WINDSCREEN WIPER DEVICE WITH LIFE SPAN INDICATOR

The invention relates to a windscreen wiper device comprising an oscillating arm and a frame connected thereto for receiving a wiper blade, which device includes a life span indicator.

Such a windscreen wiper device is known from international patent publication WO 95/01896 (Robert Bosch GmbH). The prior art windscreen wiper device includes a frame consisting of a first yoke, which is pivotally connected to an oscillating arm at the location of a pivot pin. Said first yoke functions as a carrier of two second yokes, which in turn function as carriers of two third yokes. All yokes are pivotally mounted in their respective carriers, so that a force exerted on the pivot pin of the first yoke is distributed more or less evenly over the ends of the third yokes. Said force is then transmitted to a rubber wiper blade, which wiper blade is accommodated between jaws of the second and third yokes. Environmental influences will cause ageing of the wiper blade during its period of use, so that the quality of the wiping action will deteriorate after some time. In order to give a driver of for example a car a visual indication of the degree of ageing of the wiper blade, a life span indicator in the form of an element of plastic material is mounted on the frame. The colour of the element will change visibly after a period of about six months under the influence of the sun's UV radiation.

One drawback of the windscreen wiper device as known from the aforesaid international patent publication is that the indicator that is used therein does not give a driver of for example a car an accurate and reliable indication of the degree of ageing of the rubber wiper blade. After all, even if the windscreen wiper device is not used for a prolonged period of time in the absence of rain or dense fog, and the wiper blade does not wear, therefore, the indicator will still discolour under the influence of the sun's UV radiation, and consequently indicate wrongly to the driver that the rubber wiper blade should be replaced. Moreover, in countries that have a lot of sunshine, where the windscreen wiper device will by definition used less frequently, the prior art indicator will indicate wear more quickly than in countries that have a rainy climate, where the windscreen wiper device will by definition be used more frequently.

The object of the invention is to provide a windscreen wiper device wherein the aforesaid drawbacks of the prior art are overcome, that is, wherein an accurate and reliable life span indicator is provided. In order to accomplish that objective, a windscreen wiper device of the kind referred to in the introduction is characterized in that the indicator is sensitive to water. Since the indicator is responsive to water, in particular rain water, it consequently provides a more accurate indication that the rubber wiper blade is in need of replacement. After all, the indication from the indicator is based on actual use, and consequently real wear on the wiper blade. It will be apparent that the present life span indicator provides an indication not only as regards the degree of ageing of the wiper blade, wherein in particular the quality of the rubber material plays a role, but also as regards the degree of wear on the wiper blade.

It is noted that the invention also relates to a windscreen wiper device wherein the oscillating arm and the frame are constructed as one part. The invention is not restricted to use with passenger cars for that matter, but it can also be used with trains and other vehicles.

In one preferred embodiment of a windscreen wiper device according to the invention, the indicator can change its colour in dependence on the length of time during which the indicator has been exposed to water. As a result, a driver of for example a passenger car is given a realistic signal that the wiper blade is worn and needs to be replaced, therefore. Preferably, the indicator can change its colour gradually, which has the advantage that the driver is kept informed of the condition of the wiper blade during the entire period of use (and not only at the moment that the rubber blade is actually worn).

In another preferred embodiment of a windscreen wiper device according to the invention, the indicator contains a water-soluble chemical substance. More in particular, said chemical substance can gradually dissolve in water. The advantage of this is that a colour of the present indicator present under said substance will become visible (which may or may not take place gradually) as the substance dissolves in rain water during the period of use, whilst it is furthermore not necessary to use costly substances which discolour under the influence of UV radiation, as is the case with the prior art.

In another preferred embodiment of a windscreen wiper device according to the invention, the indicator is detachably connected to the device, preferably to the frame. More in particular, the indicator is clamped or glued to the device. In the latter preferred variant, the present life span indicator is in particular in the form of a sticker.

In another preferred embodiment of a windscreen wiper device according to the invention, the indicator includes a removable cover layer. The cover layer functions to protect the actual indicator against external influences, such as moisture, in order to prevent the indication (discolouration) process from being initiated before the life span indicator is mounted on the windscreen wiper device.

The invention also relates to a life span indicator obviously suitable for use in a windscreen wiper device according to the invention.

The invention will be explained in more detail hereafter with reference to figures illustrated in a drawing, wherein:

FIG. 1 is a partially perspective view of a windscreen wiper device according to the invention; and FIG. 2 is a schematic, perspective view of a life span indicator according to the invention which is mounted on the windscreen wiper device of FIG. 1.

FIG. 1 shows a windscreen wiper device 1 comprising an oscillating arm 2 (partially shown) and a frame 3 attached to the free end thereof, which frame consists of a first yoke 4, which functions as a carrier for two second yokes 5. Yokes 5 in turn function as carriers for four third yokes 6. A rubber wiper blade 7 is held by claws 8 of yokes 5, 6. A life span indicator 9 in the form of a sticker is glued on first yoke 4.

As already noted before, indicator 9 is in the form of a sticker, to which end a self-adhering adhesive layer 10 is present on the underside of indicator 9, which is uncovered by tearing off a cover layer 11 so as to adhere indicator 9 to yoke 4. On its upper side, the indicator 9 is provided with a cover layer 12, which can likewise be torn off, which cover layer functions to protect an underlying layer 13 provided with a water sensitive substance. Said underlying layer 13 provided with said water sensitive substance forms the actual indicator, in the sense that dissolution of the substance (whether or not gradually) upon contact with rain water will result in an underlying coloured layer 14 of indicator 9 becoming visible (whether or not gradually), which is thus a clear sign that the wiper blade needs to be replaced due to wear/ageing. As already noted before, the coloured layer 14 may become visible by dissolution of the substance in rain water either gradually or not until the moment when the rubber wiper blade 7 is actually (substantially) entirely worn.

In a preferred embodiment the underlying coloured layer 14 becomes visible gradually, wherein the layer 13 responsive to rain water becomes thinner in time, particularly between 1 and 1000 microns per month. In practice this usually boils down to the underlying layer 13 being entirely dissolved in approximately two months. Instead of the coloured layer 14 becoming visible, in another preferred embodiment the word "TIME" or a company logo becomes visible.

The water sensitive substance in the underlying layer 13 is preferably entered in a membrane comprising:
a. nitrates, acetates and chlorates; and/or
b. binary components of halogens (except fluor) with metals (except silver, mercury and lead); and/or
c. sulfates (except those of barium, strontium, calcium, lead, silver and mercury).

In another preferred embodiment the water sensitive substance is a water sensitive paint brought into cellulose, or a water sensitive paint brought on top of a standard resin paint.

The invention claimed is:

1. A windscreen wiper device comprising an oscillating arm and a frame connected thereto for receiving a wiper blade, which device includes a life span indicator, characterized in that said indicator is sensitive to water, and wherein said indicator contains a water-soluble chemical substance.

2. A windscreen wiper device according to claim 1, wherein the indicator can change its colour in dependence on the length of time during which the indicator has been exposed to water.

3. A windscreen wiper device according to claim 2, wherein the indicator can change its colour gradually.

4. A windscreen wiper device according to claim 1, wherein said chemical substance can gradually dissolve in water.

5. A windscreen wiper device according to claim 1, wherein the indicator is detachably connected to the device.

6. A windscreen wiper device according to claim 5, wherein said indicator is clamped or glued to the device.

7. A windscreen wiper device according to claim 1, wherein said indicator includes a removable cover layer.

8. A windscreen wiper device according to claim 1, wherein said life span indicator is operatively connected to the windscreen wiper device to provide a visible indication to a user of the wind screen wiper device.

9. A windscreen wiper device according to claim 1, wherein said indicator comprises an outer layer of a water soluble substance and an underlying colored layer, wherein an indication of exposure to water is provided by dissolution of the outer layer to expose the underlying colored layer.

10. A windscreen wiper device according to claim 9, wherein the water soluble substance comprises a material selected from a group consisting of water soluble nitrates, acetates, chlorates and sulfates excepting sulfates of barium, strontium, calcium, lead, silver and mercury.

11. A wind screen wiper device according to claim 9, wherein the outer layer comprises a water sensitive paint.

12. A wind screen wiper device according to claim 9, wherein the outer layer comprises a water soluble paint and the underlying colored layer comprises a resin paint.

13. A wind screen wiper device according to claim 1, wherein said indicator comprises a sticker having an adhesive layer that is adapted to adhere to the wind screen wiper device, a colored layer attached to the adhesive layer and a water sensitive layer attached to the colored layer, wherein the water sensitive layer is adapted for gradual dissolution upon repeated exposure to water.

14. A windscreen wiper device according to claim 1, wherein said indicator comprises an outer layer of a water soluble substance and an underlying layer that comprises a word.

15. A windscreen wiper device according to claim 1, wherein said indicator comprises an outer layer of a water soluble substance and an underlying layer that comprises a logo.

* * * * *